United States Patent [19]

Kaminski et al.

[11] Patent Number: 5,319,962
[45] Date of Patent: Jun. 14, 1994

[54] DEVICE FOR THE IDENTIFICATION OF VEHICLE AND EQUIPMENT FEATURES

[75] Inventors: Detlef Kaminski, Kornwestheim; Thilo Kühner, Remseck; Regnerus Nieuwenhuizen, Waiblingen, all of Fed. Rep. of Germany

[73] Assignee: Mercedes-Benz AG, Fed. Rep. of Germany

[21] Appl. No.: 984,125

[22] Filed: Dec. 4, 1992

[30] Foreign Application Priority Data

Dec. 5, 1991 [DE] Fed. Rep. of Germany ....... 4140123

[51] Int. Cl.⁵ .......................................... G01M 15/00
[52] U.S. Cl. ............................... 73/116; 364/424.04; 439/34
[58] Field of Search .................. 73/116, 117, 117.1, 73/117.2, 117.3, 118.1, 118.2, 119 R, 120, 119 A; 439/34; 364/424.03, 424.04

[56] References Cited

U.S. PATENT DOCUMENTS

| 4,108,362 | 8/1978 | Trussell et al. ................ 73/116 |
| 4,441,359 | 4/1984 | Ezoe ......................... 364/424.03 |
| 4,796,206 | 1/1989 | Boscove et al. ................ 73/116 |

FOREIGN PATENT DOCUMENTS

| 2359448 | 6/1975 | Fed. Rep. of Germany . |
| 3605697 | 8/1987 | Fed. Rep. of Germany . |
| 2918956 | 8/1988 | Fed. Rep. of Germany . |
| 3831560 | 3/1989 | Fed. Rep. of Germany . |
| 3926097 | 2/1991 | Fed. Rep. of Germany . |
| 2647930 | 12/1990 | France . |

OTHER PUBLICATIONS

*Automobil-Industrie* entitled "Netzwerke und Zuverlässigkeit mit neuer Fahrzeugelektronik", Mar. 1990, pp. 255-263.

Primary Examiner—Donald Woodiel
Attorney, Agent, or Firm—Evenson, McKeown, Edwards & Lenahan

[57] ABSTRACT

A device for the identification of vehicle features essentially comprises an electronic memory circuit which is arranged fixed to the vehicle and which can be read by an external apparatus which is to be connected to the vehicle. The memory is integrated into or onto a segment of the contact element support of a diagnosis socket, which segment is detachable from the latter. A part of a film-chip film circuit can very advantageously be used for this purpose, as is known from the technology and production of electronic credit cards and data cards. The electronic memory is initially written at the factory during the production of the vehicle, and then reflects the original equipment features of the vehicle. In the event of an installation or modification for the special equipment of the vehicle, the contents of the memory can be modified or updated electrically by the apparatus.

4 Claims, 1 Drawing Sheet

U.S. Patent  June 14, 1994  5,319,962
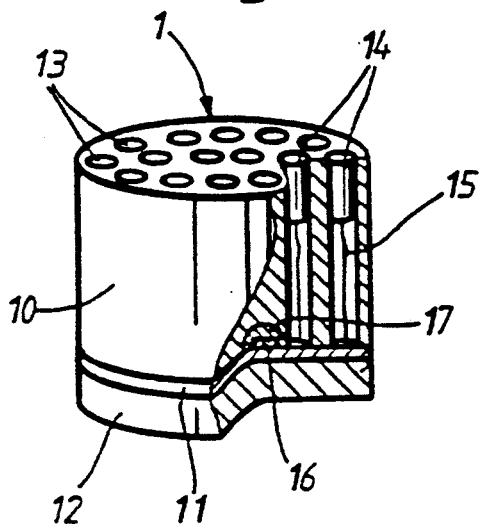
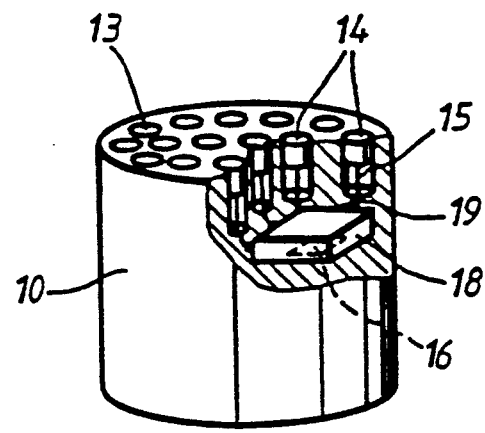
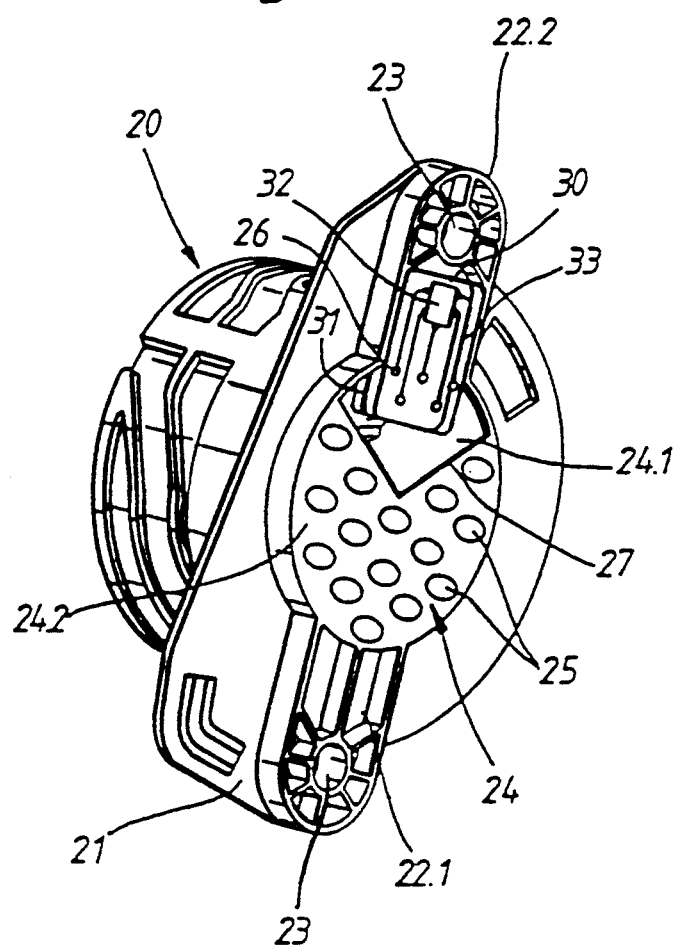

DEVICE FOR THE IDENTIFICATION OF VEHICLE AND EQUIPMENT FEATURES

BACKGROUND AND SUMMARY OF THE INVENTION

The invention relates to a device for the identification of vehicle and equipment features having at least one electronic memory of the EEPROM type in which digital data which can be allocated unambiguously to the vehicle and equipment features can be stored in a non-volatile manner. The memory is accommodated at a central point, fixed to the vehicle.

The factory-configuration of vehicles and their special equipment, especially with respect to electronic systems, has been carried out until now by means of vehicle data cards. These vehicle data cards are included with every vehicle delivery and must thereafter be kept and managed by the vehicle holder. The vehicle manufacturer retains a duplicate.

An electronic adjunct for automating the above-mentioned data cards in an electronic medium can be seen in the so-called electronic key which is produced by various car manufacturers. A suitable key with a data memory is disclosed in the specialist magazine "Impulse", No. 9/1990, issued by the Volkswagen Company.

Both the vehicle data card and the electronic key have the disadvantage that maintenance of the data carrier must essentially be carried out by the customer. These data cards are not always available when a customer service activity is carried out on the vehicle, since, in principle, neither is fixed to the vehicle.

German Patent Document DE-OS 3,926,097 describes a device for interrogating control apparatus data, such as diagnosis data or condition data, in which information on the type and number of control apparatuses present in the vehicle is stored at a central point, fixed to the vehicle. In this case, it is provided that a diagnostic apparatus initially interrogates this central point and, on the basis of data contained there in, then accesses the individual control apparatuses in an automatic sequence, or under manual control. Thus, without any prior knowledge of the type of test apparatuses installed in a vehicle, access to the test apparatuses can take place for the purpose of diagnosis. In this case, the central point may be implemented as an electronic memory which is preferably accommodated in one of the control apparatuses to be tested.

German Patent Document DE-PS 2,918,956 describes a test device for components and functions of motor vehicles having a computer. In this case, a further program module is additionally plugged onto a test apparatus having a read only program module.

The object of the invention is to create a device for the identification of vehicle and equipment features, whose data carrier requires no maintenance by the vehicle holder, which is reliably available for every customer service activity and which can easily be checked, together with contact elements to which an external diagnostic apparatus can be connected.

The present invention achieves this object by a device for the identification of vehicle and equipment features having at least one electronic memory of the EEPROM type in which digital data which can be allocated unambiguously to the vehicle and equipment features can be stored in a non-volatile manner. The memory is accommodated at a central point, fixed to the vehicle. The memory is accommodated on or in a diagnosis socket and is connected to a plurality of special identification contact elements of the diagnosis socket. Together with the contact elements, the memory is allocated as a unit to a first segment of a contact element support of the diagnosis socket, in that the contact element support also comprises at least one second element which supports a plurality of diagnosis contact elements that are connected to control apparatuses in the vehicle. On the diagnosis socket, which is expediently blocked, at least the first segment having the memory is replaceable.

The device essentially comprises a non-volatile electronic read/write memory circuit (EEPROM) which is arranged fixed to the vehicle and can be read via a diagnosis socket by an external apparatus which is to be connected to the vehicle. The memory is initially written in the factory during production of the vehicle, and then reflects the original delivery condition of the vehicle, including all the individual additional equipment. The apparatus which is to be connected to the vehicle may be a normal customer-service diagnostic apparatus. Using such an apparatus, the memory may be read before every customer-service activity. In addition, during installation or modification of the special equipment of the vehicle, the contents of the memory may be overwritten, i.e., modified or updated, by such an apparatus. The simplification for the customer is that he no longer has to keep, maintain and have available a vehicle data card nor any other loose electronic medium for customer-service requirements.

According to the present invention, the memory is accommodated on or in the diagnosis socket, is connected to a plurality of special identification contact elements of the diagnosis socket and, together with said elements, is allocated as a unit to a first segment of the contact element support of the diagnosis socket. The segment, together with the memory, can be replaced as a unit on the socket, which is expediently blocked. The other contact elements, which are connected to control apparatuses in the vehicle, are allocated to a second segment of the contact element support.

The memory can thus be detached from the vehicle without having to gain access to the control apparatuses. In the case of doubts on the validity or freedom from errors of the memory, this can simply be tested outside the vehicle. Since, in this case, the same contact elements are used as when the memory is interrogated by an external diagnostic apparatus, any contacting errors between the memory and the contact elements in the segment of the diagnosis socket which normally communicates only with a diagnostic apparatus do not remain undetected.

Further advantages are disclosed in the preferred embodiments of the device. Accordingly, a semiconductor chip, such as an EEPROM chip, may be used as the memory. The chip is mechanically and electrically connected to a film-like or foil-like, partially-metallized substrate, as is known from the technology of electronic credit cards and data cards. To this extent—with only a minor modification in the contacting—the subregion of the film circuit of an electronic credit card or data card, supporting a suitable card memory or its connecting contacts, for example, can be used directly. In consequence, such a memory can be integrated in a highly compact manner in a diagnosis socket. As a result of the use of such memory chips, which are produced reliably and cost-effectively in mass-produced batches and are already connected and pre-contacted on a film or on a foil, very high reliability is achieved both from the mechanical point of view as well as from the point of view of data errors, with low costs.

Other objects, advantages and novel features of the present invention will become apparent from the following detailed description of the invention when considered in conjunction with the accompanying drawings.

BRIEF DESCRIPTION OF THE DRAWINGS

FIG. 1 is an exploded three-dimensional view of a connecting insert of a connecting socket in which a memory chip which is mounted on a film-like substrate is integrated;

FIG. 2 is an exploded three-dimensional view of a connecting insert of a connecting socket in which a conventional memory module, which is connected to contact elements of the insert, is integrated using injection-moulding techniques; and FIG. 3 is a three-dimensional view of the prefer-red exemplary embodiment, in which a segment of the contact element support, having identification contact elements, and a memory chip, form a unit of a diagnosis socket which can be replaced as a unit.

DETAILED DESCRIPTION OF THE DRAWINGS

FIG. 1 shows the central connecting insert 1 of a diagnosis connecting socket which is fixed to the vehicle (not shown). The connecting insert 1 includes a contact element support 10 in which pin-like or socket-like diagnosis contact elements 13 are supported. In an analogous manner to this, identification contact elements 14 are also supported therein, via which the configuration of the vehicle can be read in the described manner.

The identification contact elements 14 are connected via any desired connecting means 15 to conductor tracks of a film substrate or foil substrate The substrate at least partially, but preferably completely, covers the contact element support 10 on the rear side. Under a protective cover 17 consisting of an insulating material, the substrate 11 supports a non-volatile, electronic, electrically reprogrammable memory (EEPROM) chip 16 having integrated safety and control logic. The chip 16 is preferably connected by bonding or conductive adhesive connecting techniques to conductor tracks on the substrate 11, which are not shown here.

The exemplary embodiment according to FIG. 2 uses an electronic memory chip 16 which is packaged to form a conventional memory component 18. The connections of the memory component 18 are connected to identification contact elements 14 via special contacts 19. There may also be special connecting means 15 for this purpose. In the course of individual connections between the memory chip 16 and the identification contact elements 14, preferably in each case at least one individual welded connection may be provided between two conductors, particularly in conjunction with the special conducting means. The identification contact elements 14 are preferably supported together with diagnosis contact elements 13 in a contact element support 10 which is common or is assembled from sub-segments which fit together. The memory component 18 is fixed in the contact element support 10, for example, by injection-moulding or casting techniques.

FIG. 3 shows the preferred exemplary embodiment. A connecting socket 20 has an attachment flange 21 in which, for example, two attachment arms or webs 22.2 and 22.1 are integrated. The attachment arms 22.1, 22.2 have edges that are reinforced to a greater or lesser extent. The attachment arms have, for example, external holes 23 for holding attachment means. The attachment arm or web 22.2 is formed such that, for example, it can hold a thin, chip-like module( 30 within its external edge. The external edge projects and is to that extent reinforced. The module 30 may be located, at least partially, to that extent inside the outline contour of the connecting socket on the rear side. To that extent, the module 30 may at least partially cover the central contact element support 24 in the region of identification contact elements 26. On a thin substrate 31, the module 30 contains at least one non-volatile read/write (EEPROM) memory module 32 which communicates with conductor tracks 33 which are formed by metallizations, at least in zones, of at least one of the two sides of the substrate 11 and, in a preferred embodiment, extend into the region of the covering of the central contact element support 24 by the substrate 11. There, the conductor tracks 33 are connected in a suitable manner to the ends, on the rear side, of the identification contact elements 26 in the contact element support 24, the last of which is at least symbolically split in two, as if by the separating line 27, and to that extent consists of at least subsegments 24.1 and 24.2 having a contact number and/or character which is as a rule different. The memory 32, or the module 30 containing it, is connected to the segment 24.1, which supports the identification contact element 26, to form a unit which can be replaced without it being necessary to detach the remaining wiring, or even to remove the diagnosis socket 20, for this purpose.

The other diagnosis contact elements 25 of the segment 24.2 are provided for the conventional connection of the individual cores of a diagnosis cable which is fixed to the vehicle and, to that extent, are connected at least to the various control apparatuses in the vehicle.

A film-chip circuit, which is mass-produced for credit cards and data cards, is particularly advantageously used for implementing the described circuit and connection configuration. The film-chip circuit is provided in each case with at least one solder-free welded or bonded connection of two conductors to one another in the course of individual connections between the memory 32 and identification contact elements 26. The module 30 may be at least partially covered/surrounded with/by insulating material.

To that extent, the construction of the module 30 which is shown represents no limitation of the invention. Thus, the substrate 31 may, for example, also project out of the physical module 30 so that the ends of the conductor tracks which are, if required, through-contacted there or which extend under the substrate 31 can be welded directly onto the identification contact elements 26 which are constructed, if required specially, for connecting purposes. The module 30 may equally well have a completely different design, to the extent that this is necessary or expedient for integration onto/into a diagnosis socket. The memory may in each case also be an integral component of a single-chip microcomputer, the last of which carries out the control of all memory functions in a similar manner to that which is known from telephone cards.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A device for identification of vehicle and equipment features in a vehicle, comprising:
   at least one electronic memory in which digital data can be unambiguously allocated to the vehicle and equipment features can be stored in a non-volatile manner, said memory being accommodated at a central point fixed to the vehicle;
   a diagnosis socket, having a plurality of special identification contact elements, and a contact element support accommodating the memory, said memory being connected to the plurality of special identification contact elements;
   wherein the memory and the contact elements are allocated as a unit to a first segment of the contact element support;
   said contact element support comprising at least one second element supporting a plurality of diagnosis contact elements that are connected to control apparatuses in the vehicle; and
   wherein at least the first segment of the contact element support having the memory is replaceable on the diagnosis socket which is expediently blocked.

2. A device according to claim 1, wherein a semiconductor chip is provided as the electronic memory, said chip being mounted on one of a film-like and foil-like substrate and, for the purpose of electrical connection to said special identification contact elements, communicates via conductor tracks formed by metallizations, at least in zones, on at least one of the two sides of a substrate in the diagnosis socket.

3. A device according to claim 2, wherein the substrate is configured such that it at least partially covers an area which is filled by contact elements of the diagnosis socket,
   wherein the semiconductor chip and the substrate supporting conductor tracks are a broken off part of a film-chip circuit which is mass-produced for credit cards, and
   wherein the semiconductor chip and the substrate supporting the conductor tracks are at least partially covered by an insulating material and form an integral module.

4. A device according to claim 2, wherein the electronic memory is part of a single-chip microcomputer for controlling the memory functions.

* * * * *